US011761791B2

(12) United States Patent
Adams et al.

(10) Patent No.: US 11,761,791 B2
(45) Date of Patent: *Sep. 19, 2023

(54) MODIFYING MAP ELEMENTS ASSOCIATED WITH MAP DATA

(71) Applicant: Zoox, Inc., Foster City, CA (US)

(72) Inventors: Derek Adams, Santa Clara, CA (US); Patrick Blaes, San Dimas, CA (US); Aleksandrs Ecins, San Mateo, CA (US); Jesse Sol Levinson, Redwood City, CA (US); Daniel Miller, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 17/027,297

(22) Filed: Sep. 21, 2020

(65) Prior Publication Data

US 2021/0041250 A1    Feb. 11, 2021

Related U.S. Application Data

(63) Continuation of application No. 16/145,740, filed on Sep. 28, 2018, now Pat. No. 10,782,136.

(51) Int. Cl.
*G01C 21/00*     (2006.01)
*G05D 1/02*      (2020.01)
*G01C 21/36*     (2006.01)

(52) U.S. Cl.
CPC ..... *G01C 21/3859* (2020.08); *G01C 21/3626* (2013.01); *G01C 21/3848* (2020.08);
(Continued)

(58) Field of Classification Search
None
See application file for complete search history.

(56) References Cited

U.S. PATENT DOCUMENTS

2008/0262721 A1   10/2008  Guo et al.
2015/0254986 A1*   9/2015  Fairfield ............... G08G 1/161
                                              707/687
(Continued)

FOREIGN PATENT DOCUMENTS

CN    106104656 A    11/2016
CN    107144285 A     9/2017
(Continued)

OTHER PUBLICATIONS

Lipson et al., "Driverless: Intelligent Cars and the Road Ahead", The Ultimate Mobility Device, MIT Press, 2016, Chapter 3, pp. 46-47.
(Continued)

*Primary Examiner* — Tamara L Weber
(74) *Attorney, Agent, or Firm* — Lee & Hayes, P.C.

(57) ABSTRACT

Techniques are discussed for modifying map elements associated with map data. Map data can include three-dimensional data (e.g., LIDAR data) representing an environment, while map elements can be associated with the map data to identify locations and semantic information associated with an environment, such as regions that correspond to driving lanes or crosswalks. A trajectory associated with the map data can be updated, such as when aligning one or more trajectories in response to a loop closure, updated calibration, etc. The transformation between a trajectory and an updated trajectory can be applied to map elements to warp the map elements so that they correspond to the updated map data, thereby providing automatic and accurate techniques for updating map elements associated with map data.

20 Claims, 7 Drawing Sheets

(52) U.S. Cl.
CPC ......... *G05D 1/0212* (2013.01); *G05D 1/0231*
(2013.01); *G05D 2201/0213* (2013.01)

(56) References Cited

U.S. PATENT DOCUMENTS

| | | |
|---|---|---|
| 2017/0248963 A1 | 3/2017 | Levinson et al. |
| 2017/0177933 A1 | 6/2017 | Mittal et al. |
| 2017/0248429 A1 | 8/2017 | Ponomarev et al. |
| 2017/0357858 A1 | 12/2017 | Mendonca et al. |
| 2018/0045519 A1 | 2/2018 | Ghadiok et al. |
| 2018/0149487 A1 | 5/2018 | Lee et al. |
| 2018/0189601 A1 | 7/2018 | Dabeer et al. |
| 2018/0196437 A1 | 7/2018 | Herbach et al. |
| 2018/0257660 A1 | 9/2018 | Ibrahim et al. |
| 2019/0243372 A1* | 8/2019 | Huval ............... B60W 30/0953 |
| 2020/0103236 A1 | 4/2020 | Adams et al. |

FOREIGN PATENT DOCUMENTS

| | | |
|---|---|---|
| CN | 108235725 A | 6/2018 |
| CN | 108318043 A | 7/2018 |
| WO | WO2011047730 A1 | 4/2011 |
| WO | WO2017079349 | 5/2017 |
| WO | WO2017079349 A1 | 5/2017 |
| WO | WO2018006082 | 1/2018 |
| WO | WO2018006082 A1 | 1/2018 |
| WO | WO2019161517 A1 | 8/2019 |
| WO | WO2019161517 A1 | 8/2019 |

OTHER PUBLICATIONS

Office Action for U.S. Appl. No. 16/145,740 dated Dec. 10, 2019, Adams, "Modifying Map Elements Associated with Map Data", 20 Pages.
The PCT Search Report and Written Opinion dated Dec. 19, 2019 for PCT Application No. PCT/US2019/053149, 9 pages.
Extended European Search Report dated May 27, 2022 for European Patent Application No. 19867425.1, 10 pages.
Machine translation copy of the Chinese Office Action dated May 26, 2023 for Chinese patent application No. 201980063410.1, a foreign counterpart of U.S. Pat. No. 10,782,136, 71 pages.

* cited by examiner

MODIFYING MAP ELEMENTS ASSOCIATED WITH MAP DATA

CROSS-REFERENCE TO RELATED APPLICATION(S)

This application is a continuation of and claims priority to U.S. application Ser. No. 16/145,740, filed on Sep. 28, 2018 and entitled "Modifying Map Elements Associated with Map Data," the entirety of which is incorporated herein by reference.

BACKGROUND

Data can be captured in an environment and represented as a map of the environment. Often, such maps can be used by vehicles navigating within the environment, although the maps can be used for a variety of purposes. In some cases, maps may be associated with various layers of data. However, updating one layer of a map can require the changes to be propagated to other layers, which may involve significant resources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
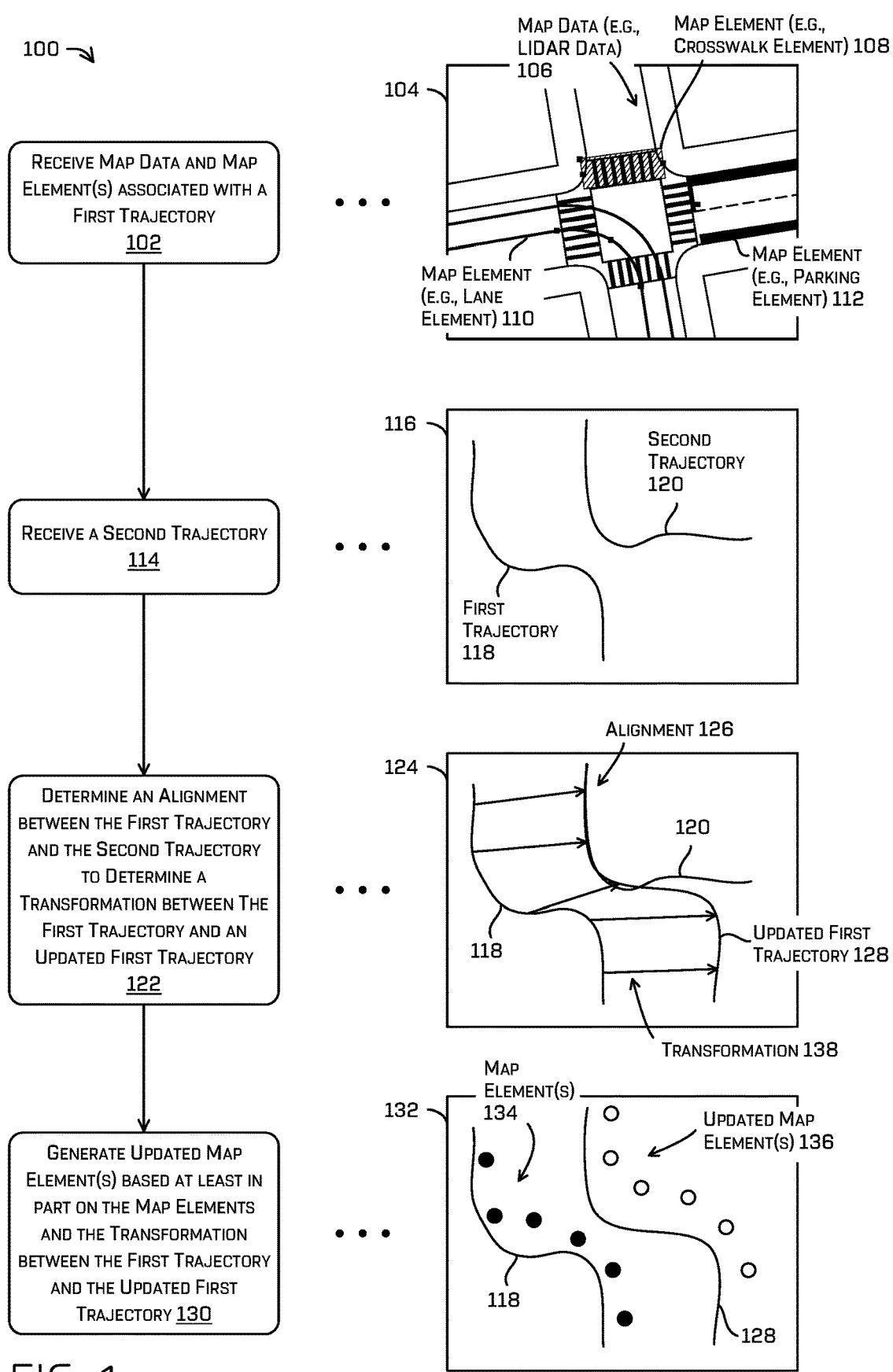
FIG. 1 is a pictorial flow diagram of an example process for receiving map data and map element(s), determining an alignment between a first and second trajectory to determine an updated first trajectory, and generating updated map element(s) based on a transformation between the first trajectory and the updated first trajectory, in accordance with embodiments of the disclosure.

This disclosure is directed to techniques for modifying map elements associated with map data. For example, map data can include three-dimensional data (e.g., LIDAR data) captured by an autonomous vehicle as the autonomous vehicle traverses an environment, and can be associated with the trajectory traveled by the autonomous vehicle while capturing such map data. In some instances, map elements can be associated with the map data to provide additional information about the environment. For example, map elements can include lane elements to indicate an extent of a lane or driving corridor, stop line elements to indicate a stop line at an intersection, traffic light elements to indicate locations of traffic lights, regions associated with speed limits, and/or any information associated with the environment.

In some cases, the trajectory associated with the map data can be updated, such as when aligning one or more trajectories in response to a loop closure, updated calibration, modifications to mapping and/or localization algorithms, and the like. If the locations of the map elements with respect to the updated map data are not updated, the map elements may be incorrectly registered with respect to the updated map data. Accordingly, the techniques discussed herein include determining an alignment between a first trajectory and a second trajectory (e.g., using an algorithm such as CLAMS (calibration, localization, and mapping, simultaneously) or SLAM (simultaneous localization and mapping)), and based on such an alignment, the first trajectory can be updated to an updated first trajectory.

The alignment can generate a transformation that can be used to generate the updated first trajectory can be used, in general, to update, warp, or otherwise modify a map element to generate a warped map element. In some instances, warping the map element can be based on a transformation associated with a closest point on the first trajectory. In some instances, a distance between a map element and a trajectory point may be below a threshold distance so as to geographically constrain warping operations. Based on a transformation between trajectory point(s) of the first trajectory and corresponding updated trajectory point(s) of the updated first trajectory (e.g., based on a change in distance and/or a change in pose of the autonomous vehicle), a map element can be modified to generate a modified map element or a warped map element. In some cases, a plurality of map elements can be warped to a plurality of warped map elements using a least squares optimization algorithm, for example.

Additional factors or constraints can be used when warping a map element to generate a warped map element. As discussed above, in some cases, a warped map element can be based at least in part on a transformation between the first trajectory and the updated first trajectory, which may include evaluating a distance (e.g., a Euclidian distance) between corresponding points on the first trajectory and the updated first trajectory, as well as evaluating a pose or a change in pose (e.g., a multi-dimensional orientation of the autonomous vehicle including one or more of an x-coordinate, a y-coordinate, a z-coordinate, a roll, a pitch, and/or a yaw)). In some cases, the warped map element can be based at least in part on one or more additional trajectory points associated with a particular point. For example, for a selected trajectory point, adjacent trajectory points (e.g., earlier/later in time or distance along the trajectory) can be used to provide additional constraints or estimates in determining a location of the warped map element. In some cases, various relationships between map elements, such as relative distances between map elements (in addition to or instead of using additional information associated with a plurality of trajectory points), can be used to constrain or estimate the relative positions of the warped map elements.

As introduced above, map elements can include lane elements to indicate an extent of a lane or driving corridor, stop line elements to indicate a stop line at an intersection, traffic light elements to indicate locations of traffic lights, regions associated with speed limits, and/or any information associated with the environment. Additional, non-limiting examples of map elements may include a bike lane element, a parking element, an intersection element, a lane divider element, a stop sign element, a yield sign element, a yield line element, and the like. As can be understood, an environment may include a plurality of physical and/or virtual features, and the map elements should not be limited to those expressly discussed herein.

In some instances, the map elements can be represented as two-dimensional geometric primitives defined by one or more control points and/or associated with various functions or parameters. For example, a crosswalk map element may include one or more map element control points defining a location of the crosswalk (e.g., in a two-dimensional global coordinate system) and/or an extent of the crosswalk (e.g., a length and width of the element). In some cases, the map element and/or the map element control points can be manually associated to the map data and/or can be added using machine learning techniques and fit automatically and/or may be adjusted manually.

Another example of a map element includes a lane element, which may define a driving corridor for an autonomous vehicle to traverse while navigating an intersection. In some examples, the lane element may comprise a non-uniform rational basis spline (NURBS) and associated control points defining a shape and location of the curve within the environment. In some cases, as the map elements may be defined with respect to a global coordinate system, the techniques discussed herein can be used to update location(s) and/or shape(s) associated with the map elements as the underlying map data is updated, as discussed herein.

In some cases, a map element (such as a traffic light element) can be represented as a three-dimensional map element. However, for map elements associated with two-dimensional information, additional height information can be associated with the map element based on three-dimensional map data representing an environment (e.g., a three-dimensional mesh of an environment or three-dimensional LIDAR data), or can be associated with a ground plane associated with the trajectory.

In some cases, map elements may further include semantic information to identify a type of object, a class of object, etc. In some instances, the map elements can be used as symbols (e.g., as linear temporal logic symbols or signal temporal logic symbols) for generating and/or evaluating trajectories for an autonomous vehicle.

The techniques discussed herein can improve a functioning of a computing device in a number of additional ways. In some cases, the initial task of associating a map element with map data may be performed manually by cartographers or skilled technicians. However, because such map elements can be associated with global location information, the map elements may not be updated when a trajectory is updated in response to a loop closure event, an updated calibration, or the like. Previous techniques have included the cartographer or skilled technician manually updating map elements in response to such updated map data, which may require several hours to several weeks of work, depending on the size of an environment, and may not properly incorporate transformations between updated trajectories. The techniques discussed herein can automate such updating operations, thereby significantly reducing processing and time required to update map elements. As can be understood, such map elements can be used in conjunction with map data to generate a trajectory for an autonomous vehicle to traverse an environment. Further, map elements that do not accurately reflect the state of the environment or that are incorrectly registered with respect to the updated map data can introduce errors into a trajectory, which can result in inefficient or unsafe navigation as the autonomous vehicle traverses an environment. For example, map elements representing a lane element that is incorrectly aligned to map data, if used to generate a trajectory for an autonomous vehicle, could result in driving on the wrong side of a road or a collision. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In another example, the techniques can be utilized in an aviation or nautical context, or in any system using maps. Further, although discussed in the context of LIDAR data, map data can include any two-dimensional, three-dimensional, or multi-dimensional data such as image data (e.g., stereo cameras, time-of-flight data, and the like)), RADAR data, SONAR data, and the like. Additionally, the techniques described herein can be used with real data (e.g., captured using sensor(s)), simulated data (e.g., generated by a simulator), or any combination of the two.

FIG. 1 is a pictorial flow diagram of an example process 100 for receiving map data and map element(s), determining an alignment between a first and second trajectory to determine an updated first trajectory, and generating updated map element(s) based on a transformation between the first trajectory and the updated first trajectory, in accordance with embodiments of the disclosure.

At operation 102, the process can include receiving map data and map element(s) associated with a first trajectory. For example, an autonomous vehicle or robotic platform can traverse an environment via a first trajectory to capture sensor data, such as LIDAR data, which is received and/or otherwise compiled as the map data. In some instances, the map data can be associated with one or more trajectories. In some instances, the map element(s) can comprise annotations added to the map data to designate areas of the map data associated with semantic information (e.g., a crosswalk area), as discussed herein. An example 104 illustrates map data 106 (e.g., LIDAR data), a map element 108 (e.g., a crosswalk element), a map element 110 (e.g., a lane element), and a map element 112 (e.g., a parking element).

For the purpose of discussion, a vehicle capturing (or utilizing) the map data 106 can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle are described throughout this disclosure.

In general, the map elements 108, 110, and 112 may represent areas of an environment associated with semantic information. In some cases, the map elements 108, 110, and 112 may comprise geometric primitives such as squares, rectangles, arcs, curves, spirals, or any shape to represent a feature of the environment. In some instances, the geometric primitives may represent a compact form of the shape. For example, a rectangle may be defined by a location (e.g., x- and y-coordinates in a global coordinate system) and an extent (e.g., a length and width). In some examples, the map elements 108, 110, and 112 may be defined or otherwise be manipulated by control points associated with the parameters of the geometric primitive. Additional details of the map elements 108, 110, and 112 are discussed below in connection with FIG. 3, as well as throughout this disclosure.

At operation 114, the process can include receiving a second trajectory. An example 116 illustrates a first trajectory 118 and a second trajectory 120. As discussed herein, the map data 106 can be associated with the first trajectory 118, while the second trajectory 120 can represent a trajectory traveled by an autonomous vehicle in the same or similar region of the environment represented by the map data 106. That is, in some cases, the first trajectory 118 and the second trajectory 120 can be related such that at least a portion of the first trajectory 118 overlaps with a least a portion of the second trajectory 120. In some case, the first trajectory 118 and the second trajectory 120 may be associated in the context of a loop closure event, which may include the process of recognizing a previously-visited location and updating a calibration accordingly. In some cases, the second trajectory may represent an updated calibration associated with the first trajectory. Examples of a loop closure event (and aligning trajectories and/or updating a calibration, discussed below), are discussed in U.S. patent application Ser. No. 15/674,853, filed Aug. 11, 2017, the entirety of which is hereby incorporated by reference.

At operation 122, the process can include determining an alignment between the first trajectory and the second trajectory to determine a transformation between the first trajectory and an updated first trajectory. An example 124 illustrates the first trajectory 118 and the second trajectory 120. The first trajectory 118 and the second trajectory 120 can be aligned (as represented by an alignment 126) to generate an updated first trajectory 128. In some examples, the operation 122 can utilize one or more algorithms such as SLAM or CLAMS to generate the updated first trajectory 128. Examples of the SLAM and CLAMS algorithm generating an updated trajectory is discussed in U.S. patent application Ser. No. 15/674,853, filed Aug. 11, 2017, the entirety of which is hereby incorporated by reference, as noted above. In some cases, the alignment operations can output a transformation (e.g., the transformation 138) between individual trajectory points associated with the first trajectory 118 and corresponding points associated with the updated first trajectory 128.

In general, the operation 122 can include aligning first LIDAR data associated with the first trajectory 118 with second LIDAR data associated with the second trajectory 120 to reduce a number of voxels (and/or a residual score) that the LIDAR data collectively occupies. That is, positions of the first LIDAR data and the second LIDAR data can be manipulated in a combinatorial fashion to reduce the number of voxels that the LIDAR data occupies. When the LIDAR data occupies a minimum number of voxels, a size of the voxels and/or a step size of the combinatorial search can be reduced to further refine the alignment of the LIDAR data sets. When an optimal alignment between the two data sets is reached, the transformation associated with the LIDAR alignment can be applied to the corresponding trajectories to determine the updated first trajectory 128. In some instances, the first LIDAR data can be received as first log data received from a first autonomous vehicle, and in some instances, the second LIDAR data can be received as second log data received from the first autonomous vehicle (representing a different time from the first log data) or from a second autonomous vehicle. Additional details of generating the updated first trajectory 128 are provided in connection with FIG. 4, as well as throughout this disclosure.

At operation 130, the process can include generating updated map element(s) based at least in part on the map elements and the transformation between the first trajectory and the updated first trajectory (e.g., SE(2), SE(3), SO(2), SO(3), and the like). An example 132 illustrates the first trajectory 118 associated with first map element(s) 134 and the updated first trajectory 128 associated with updated map element(s) 136. In some examples, the map element(s) 134 can correspond to control points associated with the map elements 108, 110, and/or 112. In some instances, the map element(s) 134 can correspond to points directly defining the map elements 108, 110, and/or 112. In some instances, the operation 130 can include determining a transformation 138 comprising a change in distance and/or pose (e.g., of the autonomous vehicle) between a trajectory point on the first trajectory 118 and a corresponding trajectory point on the updated first trajectory 128. Additional details of generating the updated map element(s) 136 are provided in connection with FIG. 5, as well as throughout this disclosure.

Figure 2:
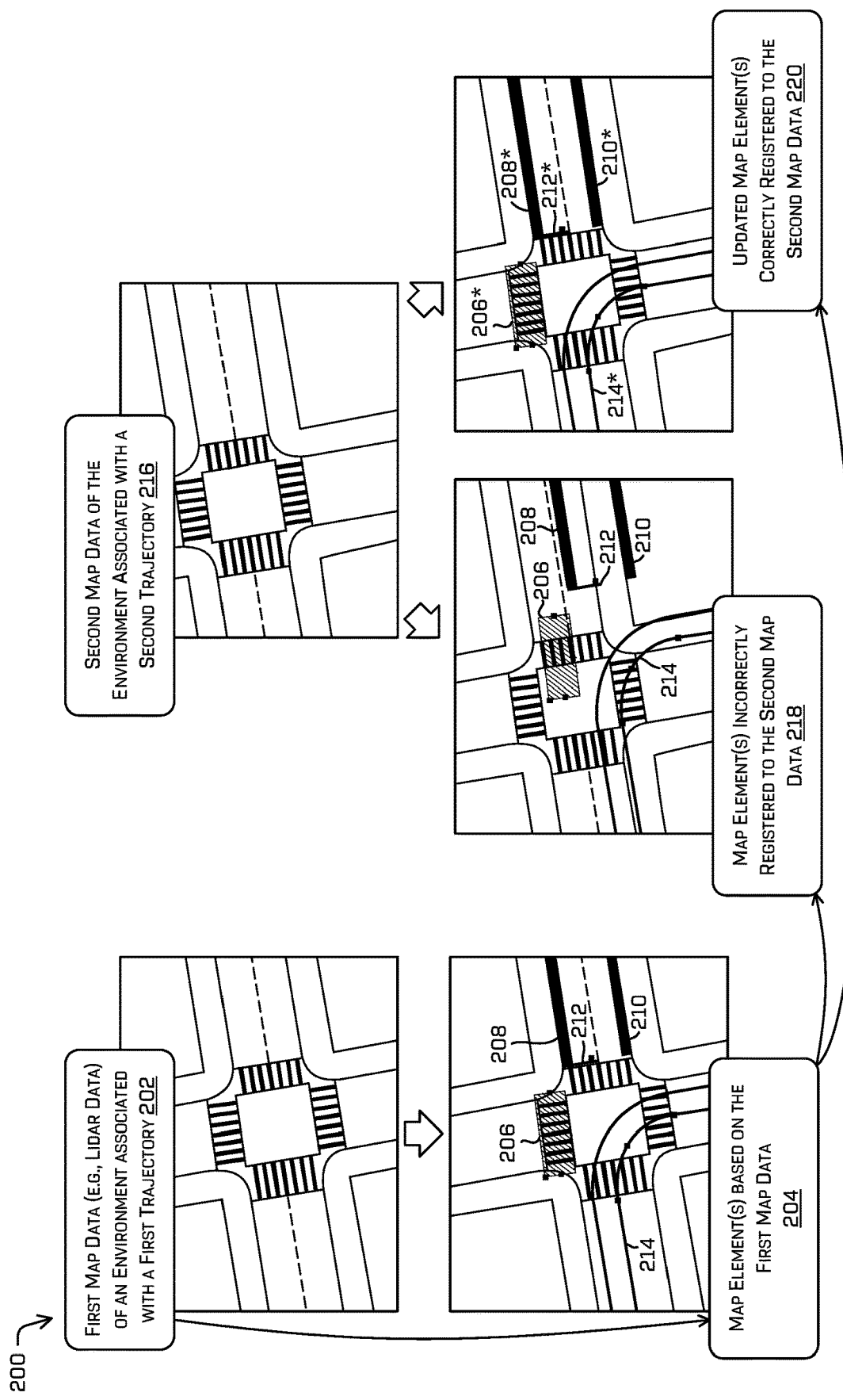
FIG. 2 is an illustration of map element(s) based on map data along with examples illustrating the map element(s) subsequently being incorrectly and correctly registered with respect to updated map data, in accordance with embodiments of the disclosure.

FIG. 2 is an illustration 200 of map element(s) based on map data along with examples illustrating the map element(s) subsequently being incorrectly and correctly registered with respect to updated map data, in accordance with embodiments of the disclosure.

An example 202 illustrates first map data of an environment associated with a first trajectory. In some examples, the first map data comprises LIDAR data captured by an autonomous vehicle in the environment. In some instances, the first map data can comprise image data, RADAR data, SONAR data, telemetry data, GPS data, wheel encoder data, and the like.

An example 204 illustrates the first map data of the example 202 including map element(s) based on the first map data. For example, the example 204 includes map elements 206, 208, 210, 212, and 214. In some examples, the map element 206 represents a crosswalk element indicating an area of the first map data that is semantically labeled to correspond to an area of the environment representing a crosswalk. In some examples, the map elements 208 and 210 represent parking elements indicating an area of the first map data that is semantically labeled to correspond to an area of the environment representing a parking area on the sides of a road. In some examples, the map element 212 represents a stop line element indicating an area of the environment that is semantically labeled to correspond to a stop line at an intersection. In some examples, the map element 214 represents a lane element indicating an area of the first map data that is semantically labeled to correspond to a drive corridor for a vehicle to traverse as the vehicle navigates an intersection (e.g., taking a left turn through the intersection). In some cases, map elements may further comprise, but are not limited to, one or more of a lane element, a bike lane element, a crosswalk element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like.

As discussed herein, in some examples the map elements 206, 208, 210, 212, and 214 can be manually added (e.g., annotated) to the map data by a cartographer or skilled technician to represent the various areas of the environment.

An example 216 illustrates second map data of the environment associated with a second trajectory. In some examples, the second trajectory can be an updated first trajectory corresponding to the first trajectory of the example 202, which may have been updated in response to a loop closure, and updated calibration, and the like. In some examples, the second trajectory can be an independent trajectory (e.g., the second trajectory may not represent an updated trajectory with respect to the first trajectory and may instead represent data captured that at least partially overlaps or is proximate to the first trajectory). As can be seen in the examples 216 and 202, the examples 216 and 202 represent the same area of the environment, although the areas are shifted with respect to one another.

An example 218 illustrates the map element(s) of the example 204 incorrectly registered to the second map data as illustrated in the example 216. As illustrated in the example 218, the map elements 206, 208, 210, 212, and 214 do not properly represent the corresponding areas of the second map data. That is, because the second map data of the example 216 is shifted or otherwise not in alignment with the first map data of the example 202, the map elements 206, 208, 210, 212, and 214 are not in alignment with the underlying second map data. That is, the global coordinates of the map elements 206, 208, 210, 212, and 214 do not correspond to the global coordinates of the second map data of the example 216.

An example 220 illustrates updated map elements 206*, 208*, 210*, 212*, and 214* correctly registered to the second map data of the example 216, according to the techniques discussed herein. Accordingly, the second map data and the updated map elements illustrated in the example 220 can be output to an autonomous vehicle to control the autonomous vehicle while traversing the environment, whereby a trajectory can be generated based on data in correct alignment, as discussed herein. As used in this example, the map element 206* (for example) corresponds to the map element 206 that has been updated to reflect the updated positions of the underlying map data (e.g., as illustrated in the example 216).

Figure 3:
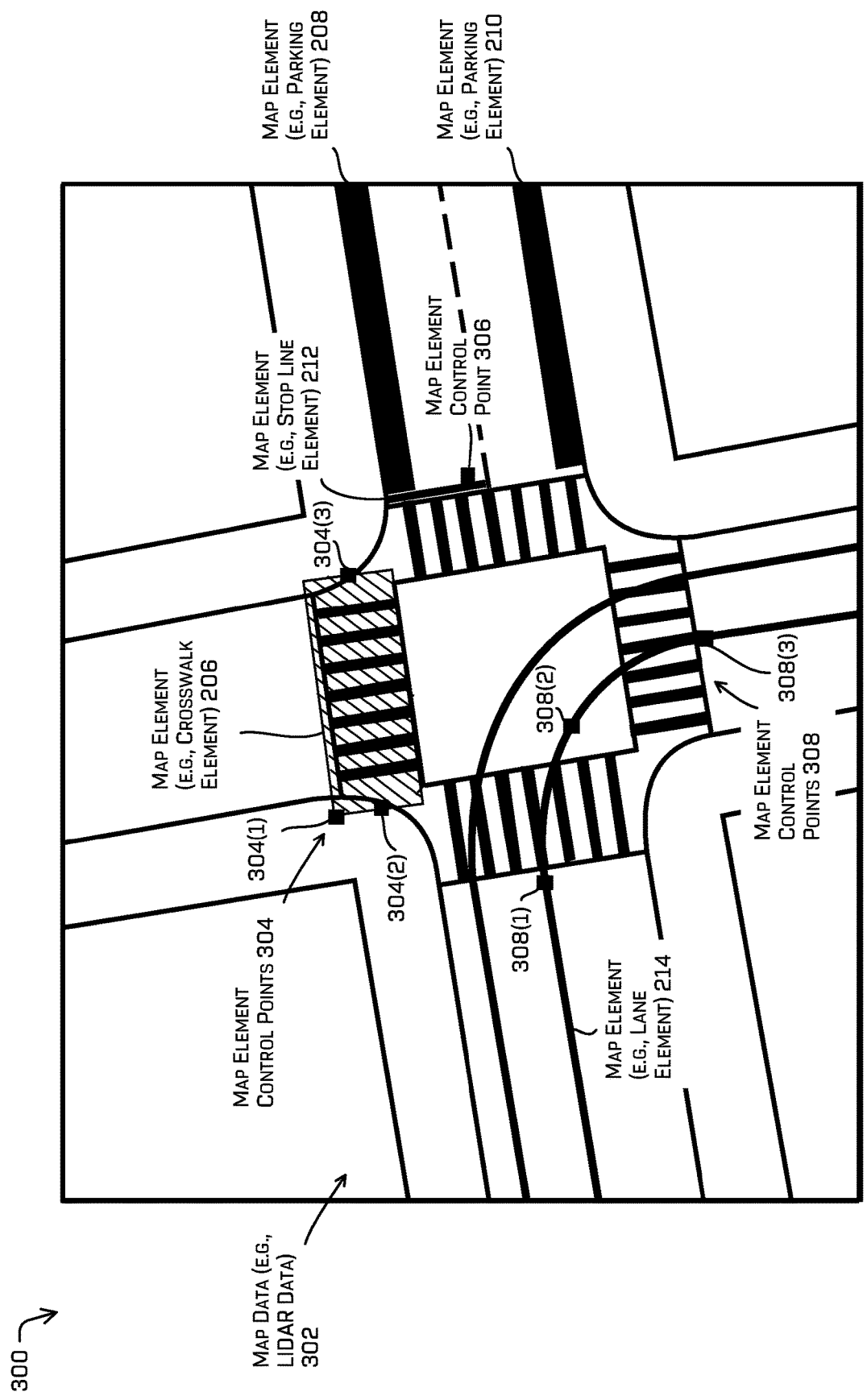
FIG. 3 is an illustration of map data including various map elements and map element control points, in accordance with embodiments of the disclosure.

FIG. 3 is an illustration 300 of map data including various map elements and map element control points, in accordance with embodiments of the disclosure.

In some instances, map data 302 can comprise LIDAR data captured by an autonomous vehicle as the autonomous vehicle traverses an environment. In some examples, the map data 302 can comprise image data (e.g., RGB image data, grayscale image data, stereo image data, time-of-flight image data, etc.), RADAR data, SONAR data, and the like. In some instances, the map data 302 can be associated with a single trajectory, while in some instances the map data 302 can be associated with a plurality of trajectories captured by a single vehicle or by a plurality of vehicles over time.

The map data 302 can be associated with various map elements 206, 208, 210, 212, and 214, as discussed above in connection with FIG. 2. In some examples, the individual map elements 206, 208, 210, 212, and 214 can represent geometric primitives, whereby each map element can be associated with one or more map control points.

The map element 206 (e.g., the crosswalk element) can be associated with map element control points 304 (e.g., 304 (1), 304(2), and 304(3)), collectively defining a location (e.g., in a global coordinate system) of the map element 206 as well as an extent (e.g., length and width) of the map element 206. The map element control points 304 are illustrated as a square overlaying the map element 206, although the map element control points 304 can be illustrated or represented by any shape. In some instances, the map data 302, the map element 206, and the map element control points 304 can be presented in a graphical user interface for a cartographer or skilled technician specialist to establish the map element 206 and/or to allow the cartographer or skilled technician to adjust the control points, thereby adjusting, warping, or otherwise modifying the map element 206. Further, in some instances, the modification techniques discussed herein are directed to automatically changing a location of the map element control points 304, which in turn can adjust the location and/or extents of the map element 206, in order to update or modify the map elements as the underlying map data is updated. In other examples, the operations can be applied directly to change the location and/or shape of the map element 206 directly without the use of map element control points.

The map element 208 (e.g., a parking element) can represent an area of the map data 302 corresponding to a parking region for vehicles. In some cases, the map element 208 can be defined by a two-dimensional bounding box, and in some cases, the map element 208 can be defined by a map element control point. A corresponding map element 210 (e.g., a parking element) is illustrated across the road from the map element 210, and can be added, warped, or otherwise modified independently from the map element 208.

The map element 212 (e.g., a stop line element) can be associated with a map element control point 306. In some cases, adjusting the map element control point 306 can modify or warp the location and/or extent of the map element 312.

The map element 214 (e.g., a lane element) can be associated with map element control points 308 (e.g., 308 (1), 308(2), and 308(3)), collectively defining a driving corridor through the intersection represented by the map data 302. In some examples, the map element control points 308(1) and 308(3) define anchor points associated with the map element 214, while the map element control point 308(2) defines a curvature of the lane element. In some examples, the map element control points 308 collectively define a NURBS, such that changing one of the map element control points 308 warps the map element 214, and accordingly, can change a driving corridor for an autonomous vehicle navigating through the environment. In some instances, the map element control points 308 and the map element 214 can be added manually via a graphical user interface and can be updated automatically accordingly to the techniques discussed herein at a time in which the underlying map data 302 and/or the underlying trajectory associated with the map data 302 is updated or otherwise adjusted.

Figure 4:
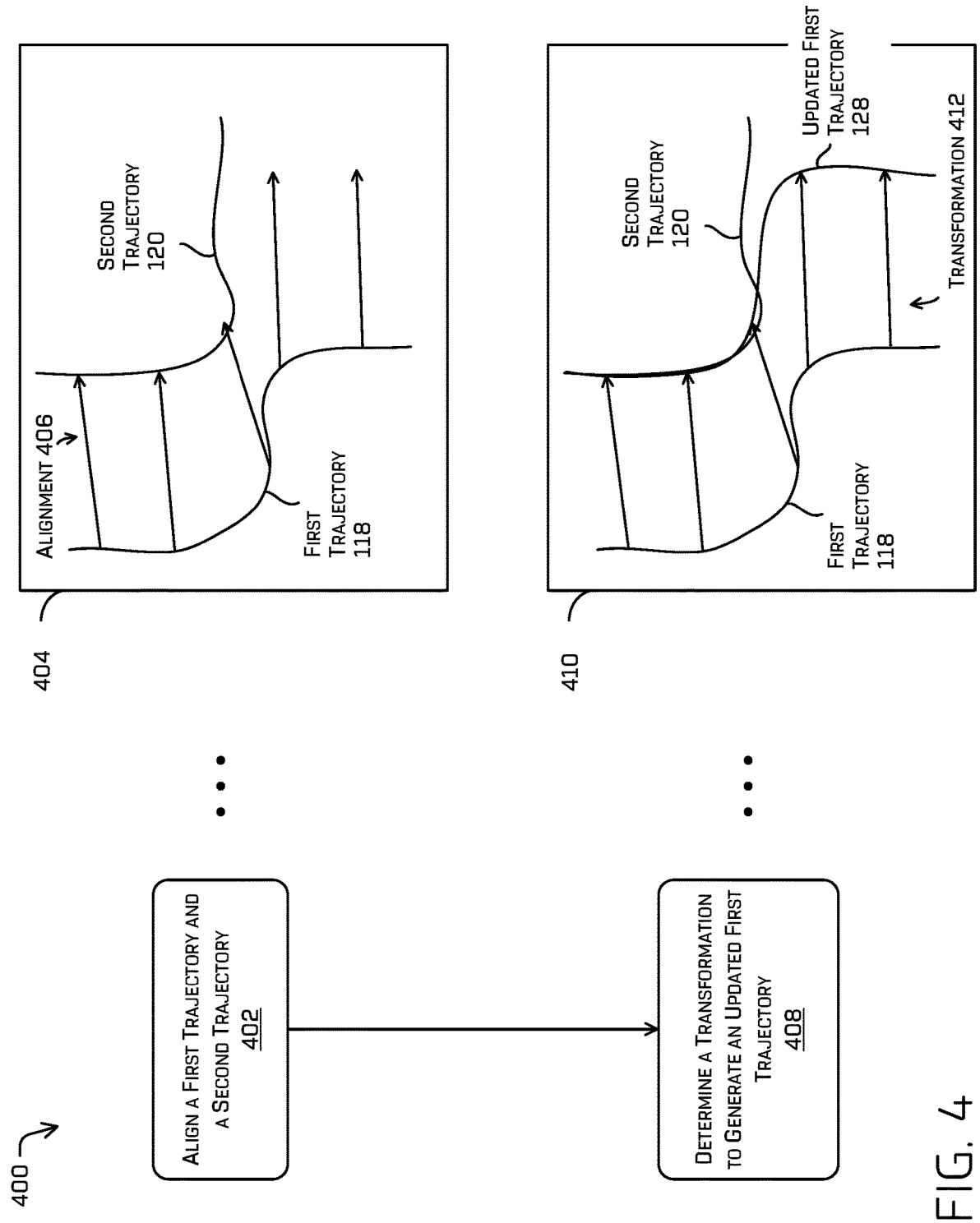
FIG. 4 is a pictorial flow diagram of an example process for determining an alignment between a first trajectory and a second trajectory, and determining a transformation to generate an updated first trajectory, in accordance with embodiments of the disclosure.

FIG. 4 is a pictorial flow diagram 400 of an example process for determining an alignment between a first trajectory and a second trajectory, and determining a transformation to generate an updated first trajectory, in accordance with embodiments of the disclosure.

At operation 402, the process can include aligning the first trajectory 118 and the second trajectory 120. In some cases, the operation 402 can include aligning first LIDAR data associated with the first trajectory 118 with second LIDAR data associated with the second trajectory 120. In some examples, the operation 402 can use a SLAM algorithm or a CLAMS algorithm (e.g., as discussed in U.S. patent application Ser. No. 15/674,853). Briefly, the operation 402 can include changing a position/orientation of one or both of the LIDAR data sets to measure a residual score associated with the "crispness" of the LIDAR data. In an example 404, an alignment algorithm such as SLAM or CLAMS can be used to determine an alignment 406 between the first trajectory 118 and the second trajectory 120.

At operation 408, the process can include determining a transformation to generate an updated first trajectory. In some instances, the updated first trajectory 128 can be based at least in part on the first trajectory 118 and the alignment 406. An example 410 illustrates the updated first trajectory 128 generated by applying the transformation 412 to the first trajectory 118. As illustrated, the updated first trajectory 128 may represent slightly different contours (e.g., a different trajectory) relative to the first trajectory 118. That is, in some instances, the updated first trajectory 128 can represent any translation, warping, shifting, skewing, etc. based on the alignment 406 between the first trajectory 118 and the second trajectory 120.

Figure 5:
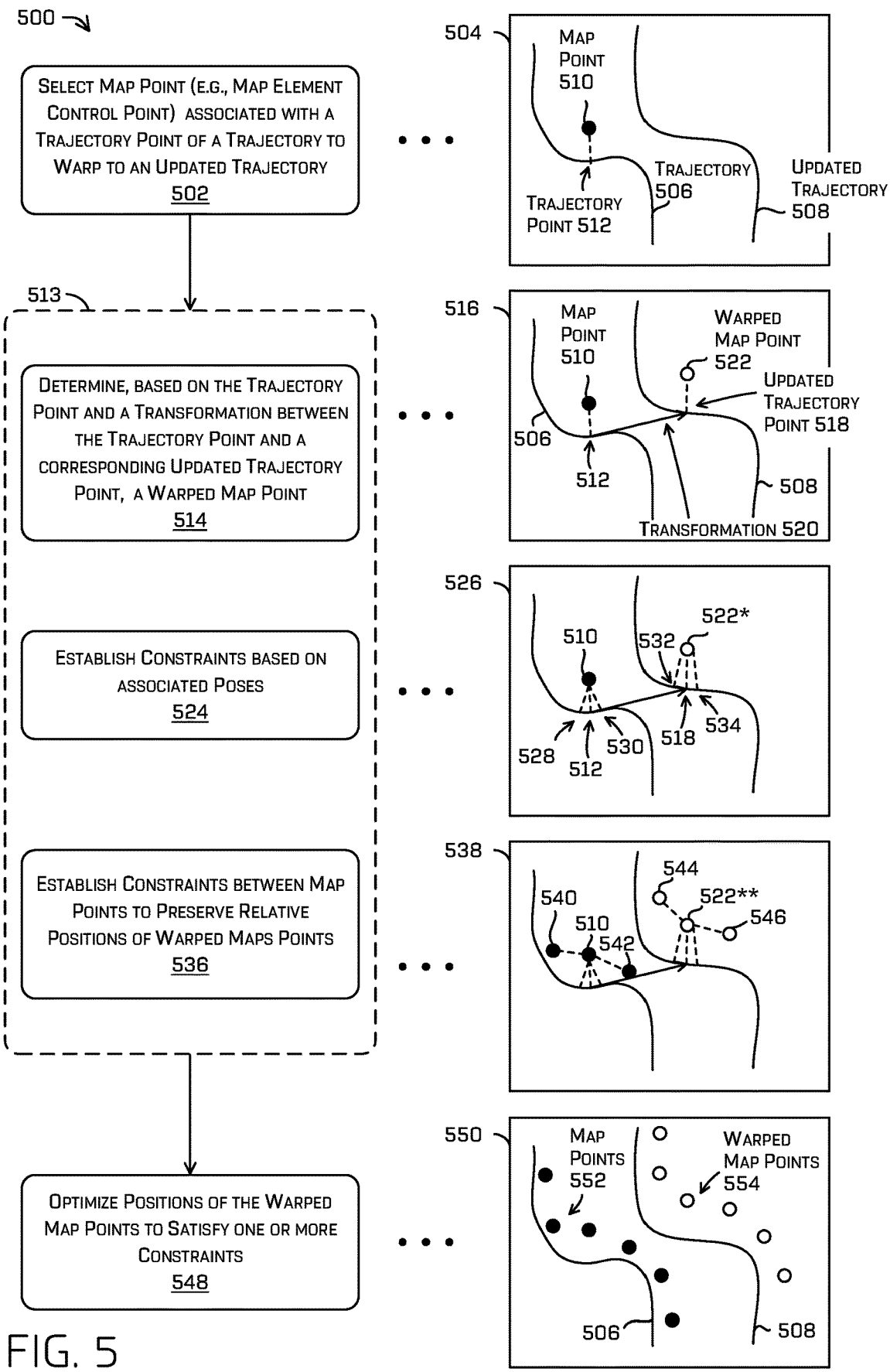
FIG. 5 is a pictorial flow diagram of an example process for selecting a map point (e.g., a map element control point) and generating a warped map point based at least in part on a transformation between a trajectory and an updated trajectory and/or based at least in part on other constraints, in accordance with embodiments of the disclosure.

FIG. 5 is a pictorial flow diagram 500 of an example process for selecting a map point (e.g., a map element control point) to generate a warped map point based at least in part on a transformation between a trajectory and an updated trajectory and/or based at least in part on other constraints, in accordance with embodiments of the disclosure.

At operation 502, the process includes selecting a map point (e.g., a map element control point) associated with a trajectory point of a trajectory to warp to an updated trajectory. An example 504 illustrates a trajectory 506 and an updated trajectory 508, as well as a map point 510. In some instances, the updated trajectory 508 can be generated according to the techniques discussed herein (e.g., using a SLAM or CLAMS algorithm for aligning trajectories and/or data associated with trajectories). That is, the trajectory 506 (or LIDAR data associated with the trajectory 506) can be aligned with another trajectory (e.g., the trajectory 120, or LIDAR data associated with the trajectory 120), and accordingly, the updated trajectory 508 can be generated based in part on the alignment.

Although the example 504 illustrates a single map point 510, it can be understood that the operations discussed herein can be performed on a plurality of map points.

In some instances, the operation 502 can include determining a trajectory point 512 on the trajectory 506 that is closest to the map point 510. That is, in some cases, the trajectory 506 can represent a discrete set of poses (e.g., x, y, z, roll, pitch, yaw) associated with an autonomous vehicle as the autonomous vehicle traverses the trajectory 506. In such a case, the operation 502 can search the trajectory 506 to determine the trajectory point 512 that is closest to the map point 510.

In some instances, the operation 502 can include determining whether the distance between the map point 510 and the trajectory point 512 is below a threshold distance. For example, if the distance meets or exceeds the threshold distance, the operation 502 can include refraining from updating the map point 510.

For example, an operation 513 may include individual warping operations that can be used individually or in combination to generate a warped map point, as discussed herein. In some instances, an operation 514 or 524 can be used to generated a warped map point. Further, in some instances, the operation 514 can be used in combination with an operation 536 to establish constraints based on additional map elements. In some instances, the operation 524 can be used in combination with the operation 536 to establish constraints based on additional map elements. Additional details of the operations 514, 524, and 536 are discussed herein.

At operation 514, the process can include determining, based at least in part on the trajectory point and a transformation between the trajectory point and a corresponding updated trajectory point, a warped map point. An example 516 illustrates an updated trajectory point 518 on the updated trajectory 508 that corresponds to the trajectory point 512 on the trajectory 506. That is, in some instances, each trajectory point (e.g., 512) on the trajectory 506 corresponds to exactly one updated trajectory point (e.g. 518) on the updated trajectory 508.

Further, in some instances, a transformation 520 between the trajectory point 512 and the updated trajectory point 518 can include at least a change in location (e.g., x-coordinate and y-coordinate in a global coordinate system) and/or a change in pose (e.g., x, y, z, roll, pitch, yaw) between the two points 512 and 518. In some instances, the transformation 520 can be the same for each point between the two trajectories 506 and 508, and in some cases, the transformation 520 can be unique to each point pair (e.g., 512 and 518).

Accordingly, the operation 514 can include determining the transformation 520 between the points 512 and 518 and applying the transformation 520 to the map point 510 to generate the warped map point 522 (e.g., an updated map point).

In some instances, the operations of generating the warped map point 522 may be completed (e.g., without additional refinements or without incorporating additional information) after the completion of the operation 514. However, in some instances, the process can include additional operations to include additional factors, information, and/or constraints into generating the warped map point 522. The notations 522, 522*, and 522** are used to distinguish between the various resulting warped map points determined in accordance with the techniques discussed herein. As can be understood, the techniques can be combined in any manner in accordance with various implementations.

At operation 524, the process can include establishing constraints based on associated poses. As discussed above, in some cases, the trajectory 506 can comprise a plurality of discrete poses of the autonomous vehicle. An example 526 illustrates determining a warped map point 522* based at least in part on the transformations, distances, and/or poses associated with the trajectory point 512, a trajectory point 528, a trajectory point 530, and the map point 510. That is, the distances between the trajectory points and the map point (e.g., a first distance between the trajectory point 512 and the map point 510, a second distance between the trajectory point 528 and the map point 510, and/or a third distance between the trajectory point 530 and the map point 510) can be used to inform the warping of the warped map point 522*. In some instances, poses associated with the trajectory points 512, 528, and/or 530 can be used to inform the warping of the warped map point 522*. In some instances, individual transformations between the trajectory points 512, 528, and 530, and the corresponding updated trajectory points 518, 532, and 534, respectively, can be used to inform the warping of the warped map point 522*. In some instances, the warping of the warped map point 522* can be based in part on some or all of the aforementioned features to preserve relative orientations of the features between the map point 510 and the warped map point 522*. In some instances, a least squares optimization can be used to estimate the location of the warped map point 522* based on the distances, poses, and/or transformations, as discussed herein. As a non-limiting example, each of three closest poses of the trajectory to the map point 510 may be used to establish three independent transformations (e.g., transformations which map the first trajectory at such points to the updated trajectory). Such transformations may be applied to the map point 510. In such an example, the transformations may yield three unique updated map points (not illustrated). The resultant warped map point 522* may, therefore, be defined as the point (and/or orientation) which minimizes a distance to all three suggested points. Of course, any number of closest points to the map point 510 may be used to inform such a warped point 522*.

At operation 536, the process can include establishing constraints between map points to preserve relative positions of warped map points. An example 538 illustrates generating a warped map point 522 based at least in part on a distance between the map point 510 and a map point 540 and a distance between the map point 510 and a map point 542. Accordingly, a position and/or orientation of the warped map point 522 may be determined based on an optimization to preserve, as closely as possible, the relative transformations between the original map points in the warped space. An example of preserving such relative transformations is illustrated as warped map points 544 and 546, relative to the position of the warped map point 522. In some instances, a least squares estimation can be used to estimate the location of the warped map point 522 based on the distances between map points, as discussed herein. In at least some examples, by introducing constraints between relative map points, it is possible to update, which is to say warp, map points in areas which do not have updated data/trajectories as modifications in one area would propagate to others by such a constraint. In at least other examples, to minimize the effects of warping in one area on other areas, such constraints may be downweighted with respect to a distance from the modified data/trajectory.

At operation 548, the process can include optimizing positions of warped map points to satisfy one or more constraints. An example 550 illustrates a plurality of map points 552 associated with the trajectory 506 and a plurality of warped map points 554 associated with the updated trajectory 508. In some instances, the operation 548 can use a least squares optimization to substantially optimize the positions of the warped points 554 based on some or all of the constraints (e.g., discussed in the context of the operations 514, 524, and 536). In some instances, the operation 548 may use a gradient descent method to optimize the warped map points 554. In some cases, other optimization algorithms may be used, and the operations are not limited to the express optimization algorithms discussed herein.

Figure 6:
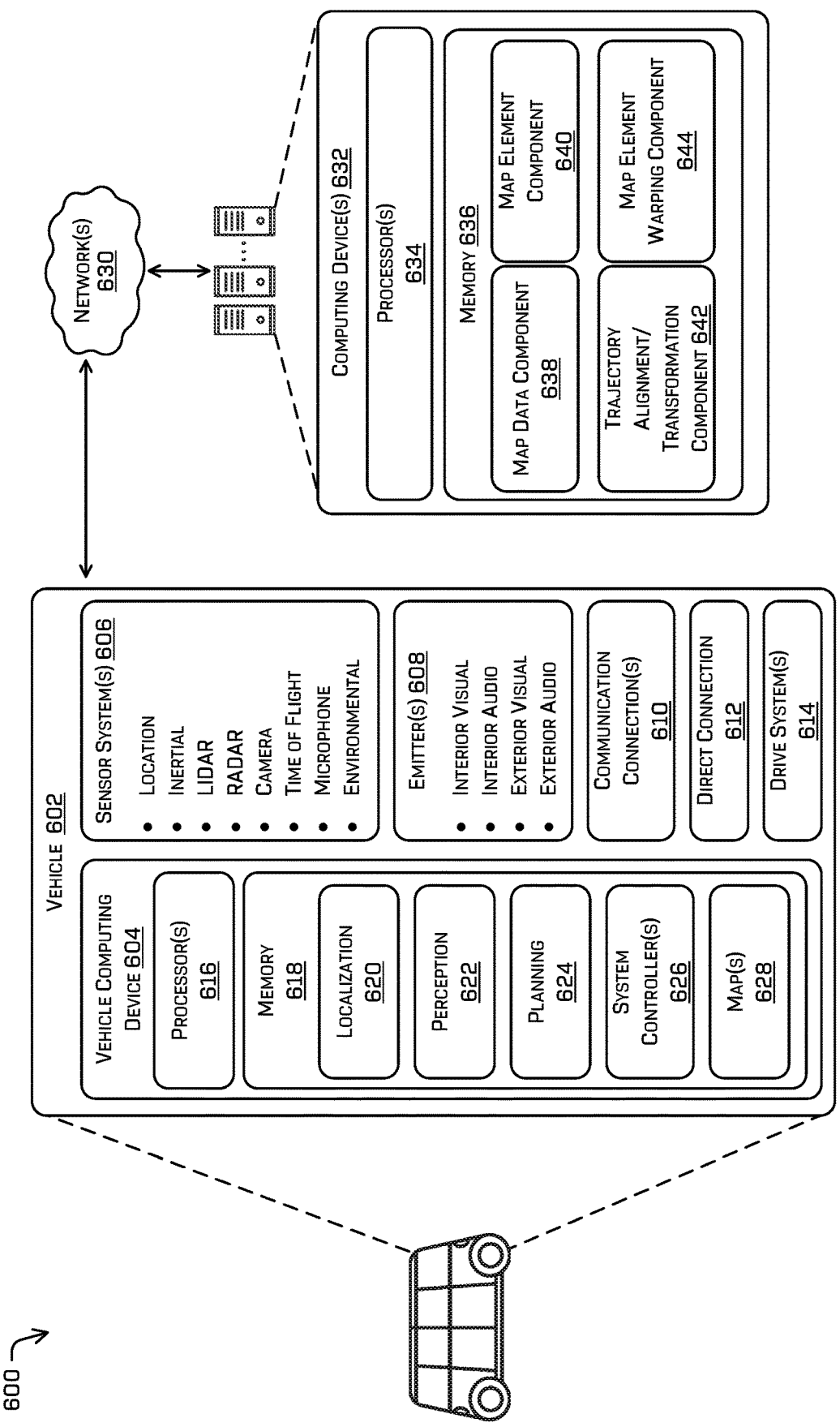
FIG. 6 depicts a block diagram of an example system for implementing the techniques described herein.

FIG. 6 depicts a block diagram of an example system 600 for implementing the techniques described herein. In at least one example, the system 600 can include a vehicle 602.

The vehicle 602 can include a vehicle computing device 604, one or more sensor systems 606, one or more emitters 608, one or more communication connections 610, at least one direct connection 612, and one or more drive systems 614.

The vehicle computing device 604 can include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing device 604 stores a localization component 620, a perception component 622, a planning component 624, one or more system controllers 626, and one or more maps 628. Though depicted in FIG. 6 as residing in memory 618 for illustrative purposes, it is contemplated that the localization component 620, the perception component 622, the planning component 624, the one or more system controllers 626, and the one or more maps 628 may additionally, or alternatively, be accessible to the vehicle 602 (e.g., stored remotely).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for generating map data, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional or alternative examples, the perception component 622 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 624 can determine a path for the vehicle 602 to follow to traverse through an environment. For example, the planning component 624 can determine various routes and trajectories and various levels of detail. For example, the planning component 624 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In some instances, the planning component 624 can include a prediction component to generate predicted trajectories of objects in an environment. For example, a prediction component can generate one or more predicted trajectories for vehicles, pedestrians, animals, and the like within a threshold distance from the vehicle 602. In some instances, a prediction component can measure a trace of an object and generate a trajectory for the object based on observed and predicted behavior.

In at least one example, the vehicle computing device 604 can include one or more system controllers 626, which can be configured to control steering, propulsion, braking, safety, emitters, communication, and other systems of the vehicle 602. These system controller(s) 626 can communicate with and/or control corresponding systems of the drive system(s) 614 and/or other components of the vehicle 602.

The memory 618 can further include one or more maps 628 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 628 can include at least one map (e.g., images and/or a mesh). In some examples, the vehicle 602 can be controlled based at least in part on the maps 628. That is, the maps 628 can be used in connection with the localization component 620, the perception component 622, and/or the planning component 624 to determine a location of the vehicle 602, identify objects in an environment, and/or generate routes and/or trajectories to navigate within an environment.

In some cases, the maps 628 can include map data and map elements that have been updated and/or modified in accordance with the techniques discussed herein. That is, the vehicle 602 can generate a trajectory to traverse an environment based at least in part on map data and map elements generated in accordance with this disclosure.

In some examples, the one or more maps 628 can be stored on a remote computing device(s) (such as the computing device(s) 632) accessible via network(s) 630. In some examples, multiple maps 628 can be stored based on, for example, a characteristic (e.g., type of entity, time of day, day of week, season of the year, etc.). Storing multiple maps 628 can have similar memory requirements, but increase the speed at which data in a map can be accessed.

In some instances, aspects of some or all of the components discussed herein can include any models, algorithms, and/or machine learning algorithms. For example, in some instances, the components in the memory 618 (and the memory 636, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 606 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 606 can include multiple instances of each of these or other types of sensors. For instance, the LIDAR sensors can include individual LIDAR sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604. Additionally or alternatively, the sensor system(s) 606 can send sensor data, via the one or more networks 630, to the one or more computing device(s) at a particular frequency, after a lapse of a predetermined period of time, in near real-time, etc.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 630. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive modules 614. In some examples, the vehicle 602 can have a single drive module 614. In at least one example, if the vehicle 602 has multiple drive modules 614, individual drive modules 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive system(s) 614. Furthermore, the drive system(s) 614 also include one or more communication connection(s) that enable communication by the respective drive module with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In some examples, the vehicle 602 can send sensor data to one or more computing device(s) 632 via the network(s) 630. In some examples, the vehicle 602 can send raw sensor data to the computing device(s) 632. In other examples, the vehicle 602 can send processed sensor data and/or representations of sensor data to the computing device(s) 632. In some examples, the vehicle 602 can send sensor data to the computing device(s) 632 at a particular frequency, after a lapse of a predetermined period of time, in near real-time, etc. In some cases, the vehicle 602 can send sensor data (raw or processed) to the computing device(s) 632 as one or more log files.

The computing device(s) 632 can include processor(s) 634 and a memory 636 storing a map data component 638, a map element component 640, a trajectory alignment/transformation component 642, and a map element warping component 644.

In some instances, the map data component 638 can include functionality to receive one or more trajectories and map data associated with the one or more trajectories. For example, the map data component 638 can receive LIDAR data captured by one or more LIDAR sensors of the vehicle 602 to generate three-dimensional map data of an environment. In some instances, the map data can be associated with a single trajectory or a set of trajectories. In some instances, a trajectory can comprise a discrete series of poses associated with the vehicle 602 at a time of capturing the map data, as discussed herein.

In some instances, the map element component 640 can include functionality to receive map elements and/or to associate such map elements with map data. In some instances, the map elements can include lane elements to indicate an extent of a lane or driving corridor, stop line elements to indicate a stop line at an intersection, traffic light elements to indicate locations of traffic lights, regions associated with speed limits, and/or any information associated with the environment. Additional, non-limiting examples of map elements may include a bike lane element, a parking element, an intersection element, a lane divider element, a stop sign element, a yield sign element, a yield line element, and the like. As can be understood, an environment may include a plurality of physical and/or virtual features, and the map elements should not be limited to those expressly discussed herein. In some instances, a map element can define a location, an extent, and semantic information associated with the map element.

In some instances, map data associated with the map data component 638 and/or the map element(s) associated with the map element component 640 can be defined with respect to a global coordinate system and/or with respect to a local coordinate system.

In some instances, trajectory alignment/transformation component 642 can include functionality to align a first trajectory with a second trajectory and/or to generate an updated first trajectory based on the alignment between the first trajectory and the second trajectory. In some instances, the trajectory alignment/transformation component 642 can align first LIDAR data associated with a first trajectory with second LIDAR data associated with a second trajectory, and in the process, can generate an updated trajectory associated with the first trajectory. In some instances, the trajectory alignment/transformation component 642 can utilize SLAM, CLAMS, or other calibration and/or alignment algorithms to generate the updated trajectory for use in generating warped map elements.

In some instances, the map element warping component 644 can include functionality to generate warped map elements, as discussed herein. In some instances, the map element warping component 644 can perform the operations to generate, modify, warp, or otherwise update map element control points and/or points directly associated with a map element, as explained above with respect to FIGS. 1-5. In some instances, the map element warping component 644 can warp a map element based at least in part on 1) a transformation between a trajectory point associated with a trajectory and the corresponding trajectory point associated with the updated trajectory; 2) a plurality of trajectory points associated with a map element; and/or 3) relative or absolute distances between adjacent or proximate map points. Additional details of the map element warping component 644 are discussed throughout the disclosure.

The processor(s) 616 of the vehicle 602 and the processor(s) 634 of the computing device(s) 632 can be any suitable processor capable of executing instructions to process data and perform operations as described herein. By way of example and not limitation, the processor(s) 616 and 634 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 636 are examples of non-transitory computer-readable media. The memory 618 and 636 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 618 and 636 can include at least a working memory and a storage memory. For example, the working memory may be a high-speed memory of limited capacity (e.g., cache memory) that is used for storing data to be operated on by the processor(s) 616 and 634. In some instances, the memory 618 and 636 can include a storage memory that may be a lower-speed memory of relatively large capacity that is used for long-term storage of data. In some cases, the processor(s) 616 and 634 cannot operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 602 can be associated with the computing device(s) 632 and/or components of the computing device(s) 632 can be associated with the vehicle 602. That is, the vehicle 602 can perform one or more of the functions associated with the computing device(s) 632, and vice versa.

FIGS. 1, 4, 5, and 7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 7:
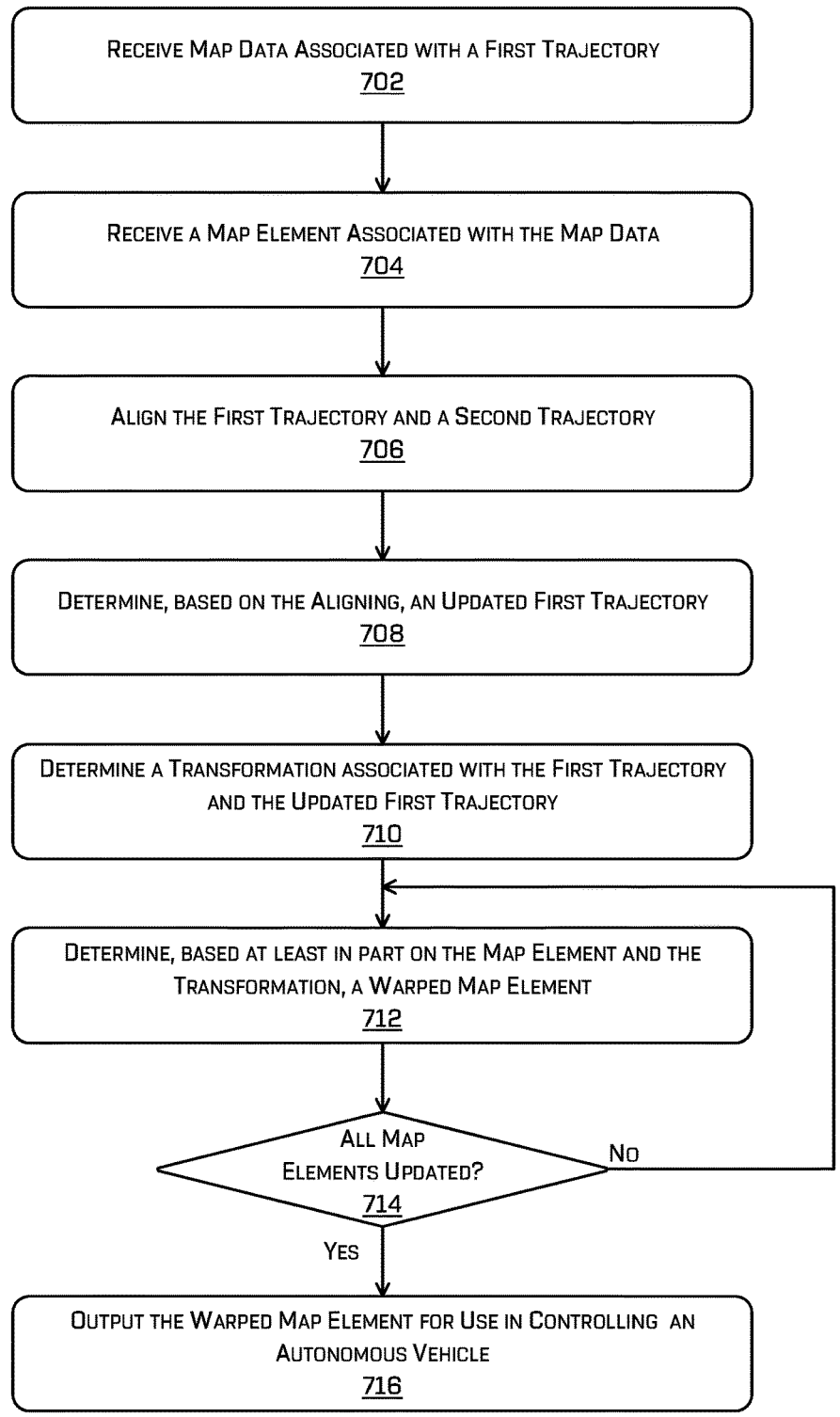
FIG. 7 depicts an example process for generating warped map element(s) based on a transformation between a trajectory and an updated trajectory, in accordance with embodiments of the disclosure.

FIG. 7 depicts an example process 700 for generating warped map element(s) based on a transformation between a trajectory and an updated trajectory, in accordance with embodiments of the disclosure. For example, some or all of the process 700 can be performed by one or more components in FIG. 6, as described herein. For example, some or all of the process 700 can be performed by the vehicle computing device(s) 604 and/or the computing device(s) 632.

At operation 702, the process can include receiving map data associated with a first trajectory. In some instances, the operation 702 can include receiving sensor data captured by a sensor of an autonomous vehicle. In some instances, the operation 702 can include receiving log data comprising previously captured data from one or more vehicle (autonomous or otherwise). In some examples, the sensor data may include any sensor modality, including, but not limited to LIDAR data captured by a LIDAR sensor. In some instances, the process 700 can be performed by a non-autonomous vehicle, by a sensor system, or by a robotic platform, and is not limited to autonomous vehicles.

At operation 704, the process can include receiving a map element associated with the map data. In some instances, the map element can represent any area of map data, as well as semantic information associated with the area. Examples of the various map elements are discussed throughout the disclosure. In some instances, the map elements can be generated using a feature recognition algorithm (e.g., based on the LIDAR data, image data, etc.) comprising the map data, and in some instances, the map element can be received as an annotation to map data provided by a cartographer or skilled technician. However, in some instances, rather than running such a feature recognition algorithm on updated map data, the operations discussed herein can preserve the information associated with to map elements and/or relationships between trajectories, trajectory points, and/or additional map elements, as discussed herein. In some examples, the map element can comprise a geometric primitive for compact representation in memory, although a plurality of representations are contemplated.

At operation 706, the process can include aligning the first trajectory and a second trajectory. In some instances, at least a portion of the second trajectory can be proximate to the first trajectory and/or within a threshold distance of the first trajectory. In some instances, the second trajectory may represent a loop closure event, an updated calibration, an addition of new data to the first trajectory, and the like. In some instances, the operation 706 can include aligning first map data (e.g., first LIDAR data) associated with the first trajectory with second map data (e.g., second LIDAR data) associated with the second trajectory to determine an alignment between the two sets of map data. In some instances, the operation 706 can include utilizing a SLAM or CLAMS algorithm to align the map data and/or trajectories.

At operation 708, the process can include determining, based at least in part on the aligning, an updated first trajectory. In some instances, the updated trajectory can be generated to maximize an alignment with the second trajectory, as discussed herein.

At operation 710, the process can include determining a transformation associated with the first trajectory and the updated first trajectory. In some cases, each trajectory point of the first trajectory can be transformed to a unique updated trajectory point associated with the updated trajectory. In some cases, an absolute position and/or pose of the updated trajectory point may be transformed with respect to the position and pose of the trajectory point.

At operation 712, the process can include determining, based at least in part on the map element and the transformation, a warped map element. Details of warping a map element to generate a warped map element (or warped map point, updated map point, or warped map element control point) are discussed in connection with FIGS. 1-5, and throughout this disclosure.

At operation 714, the process can include determining whether all map elements are updated. In some instances, the operations can include updating the map elements based on a least squares optimization algorithm. In some instances, each map point can be optimized individually. In some cases, if not all map elements have been updated, the process can return to the operation 712 whereby additional map elements can be warped until all map elements (and/or until all map element control points) have been updated.

At operation 716, the process can include outputting the warped map element for use in controlling an autonomous vehicle. In some instances, the warped map element can represent a symbol to be used in a temporal logic context (e.g., linear temporal logic, signal temporal logic, etc.) to generate and/or validate a trajectory. In some instances, the warped map elements can be used by other components of the autonomous vehicle for localizing the autonomous vehicle and/or navigating the autonomous vehicle through an environment.

EXAMPLE CLAUSES

A: A system comprising: one or more processors; and one or more computer-readable media storing instructions executable by the one or more processors, wherein the instructions, when executed, cause the system to perform operations comprising: receiving map data representing an environment, the map data associated with a first trajectory traversed by an autonomous vehicle and based, at least in part, on first LIDAR data of the environment; receiving a map element associated with the map data, the map element comprising at least one of a lane element, a crosswalk element, or a stop line element; aligning the first LIDAR data associated with the first trajectory and second LIDAR data associated with a second trajectory; determining, based on the aligning, an updated first trajectory; determining a trajectory point of the first trajectory associated with the map element; determining a transformation associated with the trajectory point and a corresponding trajectory point of the updated first trajectory; and determining a warped map element based at least in part on applying the transformation to the map element.

B: The system of paragraph A, wherein determining the transformation associated with the trajectory point comprises: determining, as the transformation, one or more of a relative position or orientation of the trajectory point with respect to the corresponding trajectory point of the updated first trajectory.

C: The system of paragraph A or B, wherein determining the trajectory point comprises: determining a distance between the map element and the trajectory point associated with the first trajectory; and determining that the distance is below a threshold distance.

D: The system of any of paragraphs A-C, wherein determining the warped map element is further based at least in part on: one or more additional trajectory points associated with the first trajectory; or one or more additional map elements.

E: The system of any of paragraphs A-D, the operations further comprising: outputting the warped map element for use in controlling the autonomous vehicle.

F: A method comprising: receiving map data associated with a first trajectory; receiving a map element associated with the map data; aligning the first trajectory and a second trajectory; determining, based on the aligning, an updated first trajectory; determining a transformation associated with the first trajectory and the updated first trajectory; and determining, based at least in part on the map element and the transformation, a warped map element.

G: The method of paragraph F, wherein aligning the first trajectory and the second trajectory comprises: determining an alignment between first LIDAR data associated with the first trajectory and second LIDAR data associated with the second trajectory.

H: The method of paragraph F or G, wherein the map element comprises an area associated with the map data, and wherein determining the warped map element comprises: changing a location of a point associated with the area to update at least one of a size or location of the map element as the warped map element.

I: The method of any of paragraphs F-H, wherein the map element comprises at least one of: a lane element; a bike lane element; a crosswalk element; an intersection element; a lane divider element; a traffic light element; a stop sign element; a stop line element; a yield sign element; or a yield line element.

J: The method of any of paragraphs F-I, wherein determining the transformation associated with the first trajectory and the updated first trajectory comprises: determining a trajectory point associated with the map element; and determining, as the transformation, one or more of a relative position or orientation of the trajectory point with respect to a corresponding trajectory point of the updated first trajectory.

K: The method of paragraph J, wherein determining the trajectory point comprises: determining a distance between the map element and the trajectory point associated with the first trajectory; and determining that the distance is below a threshold distance.

L: The method of paragraph J or K, wherein determining the warped map element is further based at least in part on: one or more additional trajectory points associated with the first trajectory; or one or more additional map elements.

M: The method of any of paragraphs F-L, wherein the second trajectory represents an updated calibration associated with the first trajectory.

N: The method of any of paragraphs F-M, wherein the map element is one of a plurality of map elements, and wherein the warped map element is one of a plurality of warped map elements, the method further comprising: performing a least squares optimization to determine, based at least in part on the plurality of map elements and the transformation, the plurality of warped map elements.

O: The method of any of paragraphs F-N, further comprising: outputting the warped map element for use in controlling a robotic platform.

P: A non-transitory computer-readable medium storing instructions that, when executed, cause one or more processors to perform operations comprising: receiving map data associated with a first trajectory; receiving a map element associated with the map data; aligning the first trajectory and a second trajectory; determining, based on the aligning, an updated first trajectory; determining a transformation associated with the first trajectory and the updated first trajectory; and determining, based at least in part on the map element and the transformation, a warped map element.

Q: The non-transitory computer-readable medium of paragraph P, wherein the map element comprises a geometric primitive associated with the map data, and wherein determining the warped map element comprises: changing a location of a control point of the geometric primitive to update at least one or a size or location of the map element as the warped map element.

R: The non-transitory computer-readable medium of paragraph P or Q, wherein determining the transformation associated with the first trajectory and the updated first trajectory comprises: determining a trajectory point associated with the map element; and determining one or more of a relative position or orientation between a trajectory point of the first trajectory and a corresponding point on the updated first trajectory.

S: The non-transitory computer-readable medium of paragraph R, wherein determining the trajectory point comprises determining that the trajectory is a closest trajectory point to the map element.

T: The non-transitory computer-readable medium of any of paragraphs P-S, wherein determining the warped map element is further based at least in part on: one or more additional trajectory points associated with the first trajectory; or one or more additional map elements.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
determining an alignment between first sensor data associated with a first trajectory and second sensor data associated with a second trajectory;
determining, based on the alignment, an updated first trajectory different from the first trajectory and the second trajectory;
determining a transformation associated with the first trajectory and the updated first trajectory;
determining, based at least in part on a map element associated with the first trajectory and the transformation associated with the first trajectory and the updated first trajectory, a modified map element;
updating, as an updated map, a map to comprise the modified map element; and
transmitting the updated map to an autonomous vehicle configured to be maneuvered based at least in part on the updated map.

2. The system of claim 1, wherein the first sensor data comprises first LIDAR data and the second sensor data comprises second LIDAR data.

3. The system of claim 1, wherein the map element comprises an area in an environment associated with map data, and wherein updating the map comprises updating at least one of a size or location of the map element as the modified map element.

4. The system of claim 1, wherein the map element comprises at least one of:
a lane element;
a bike lane element;
a crosswalk element;
an intersection element;
a lane divider element;
a traffic light element;
a stop sign element;
a stop line element;
a yield sign element; or
a yield line element.

5. The system of claim 1, wherein determining the transformation comprises:
determining a trajectory point associated with the map element; and
determining, as the transformation, one or more of a relative position or orientation of the trajectory point with respect to a corresponding trajectory point of the updated first trajectory.

6. The system of claim 5, wherein determining the trajectory point comprises:
determining a distance between the map element and the trajectory point associated with the first trajectory; and
determining that the distance is below a threshold distance.

7. A method comprising:
determining an alignment between first sensor data associated with a first trajectory and second sensor data associated with a second trajectory;
determining, based on the alignment, an updated first trajectory different form the first trajectory and the second trajectory;
determining a transformation associated with the first trajectory and the updated first trajectory;
determining, based at least in part on a map element associated with the first trajectory and the transformation associated with the first trajectory and the updated first trajectory, a modified map element;
updating, as an updated map, a map to comprise the modified map element; and
transmitting the updated map to an autonomous vehicle configured to be maneuvered based at least in part on the updated map.

8. The method of claim 7, wherein the first sensor data comprises first LIDAR data and the second sensor data comprises second LIDAR data.

9. The method of claim 7, wherein the map element comprises an area in an environment associated with map data, and wherein updating the map comprises updating at least one of a size or location of the map element as the modified map element.

10. The method of claim 7, wherein the map element comprises at least one of:
a lane element;
a bike lane element;
a crosswalk element;
an intersection element;
a lane divider element;
a traffic light element;
a stop sign element;
a stop line element;
a yield sign element; or
a yield line element.

11. The method of claim 7, wherein determining the transformation comprises:
determining a trajectory point associated with the map element; and
determining, as the transformation, one or more of a relative position or orientation of the trajectory point with respect to a corresponding trajectory point of the updated first trajectory.

12. The method of claim 11, wherein determining the trajectory point comprises:
determining a distance between the map element and the trajectory point associated with the first trajectory; and
determining that the distance is below a threshold distance.

13. The method of claim 11, wherein determining the modified map element is further based at least in part on:
one or more additional trajectory points associated with the first trajectory; or
one or more additional map elements.

14. The method of claim 7, further comprising:
outputting the modified map element to a fleet of vehicles.

15. The method of claim 7, wherein the map element is one of a plurality of map elements, and wherein the modified map element is one of a plurality of modified map elements, the method further comprising:
performing a least squares optimization to determine, based at least in part on the plurality of map elements and the transformation, the plurality of modified map elements.

16. A one or more non-transitory computer-readable media storing instructions that, when executed, cause one or more processors to perform operations comprising:
determining an alignment between first sensor data associated with a first trajectory and second sensor data associated with a second trajectory;
determining, based on the alignment, an updated first trajectory different form the first trajectory and the second trajectory;
determining a transformation associated with the first trajectory and the updated first trajectory associated with the first trajectory and the updated first trajectory;

determining, based at least in part on a map element associated with the first trajectory and the transformation, a modified map element;

updating, as an updated map, a map to comprise the modified map element; and transmitting the updated map to an autonomous vehicle configured to be maneuvered based at least in part on the updated map.

17. The one or more non-transitory computer-readable media of claim 16, wherein the map element comprises a geometric primitive in an environment associated with map data, and wherein updating the map comprises updating at least one or a size or location of the map element as the modified map element.

18. The one or more non-transitory computer-readable media of claim 16, wherein determining the transformation comprises:

determining a trajectory point of the first trajectory associated with the map element; and determining one or more of a relative position or orientation between the trajectory point of the first trajectory and a corresponding point on the updated first trajectory.

19. The one or more non-transitory computer-readable media of claim 18, wherein determining the trajectory point comprises determining that the trajectory point is a closest trajectory point to the map element.

20. The one or more non-transitory computer-readable media of claim 16, wherein determining the modified map element is further based at least in part on:

one or more additional trajectory points associated with the first trajectory; or one or more additional map elements.

\* \* \* \* \*

UNITED STATES PATENT AND TRADEMARK OFFICE
CERTIFICATE OF CORRECTION

| | |
|---|---|
| PATENT NO. | : 11,761,791 B2 |
| APPLICATION NO. | : 17/027297 |
| DATED | : September 19, 2023 |
| INVENTOR(S) | : Derek Adams et al. |

Page 1 of 1

It is certified that error appears in the above-identified patent and that said Letters Patent is hereby corrected as shown below:

In the Claims

Column #23, Line 60, change "form" to --from--.

Column #24, Line 63, change "form" to --from--.

Signed and Sealed this
Twenty-seventh Day of February, 2024

Katherine Kelly Vidal
*Director of the United States Patent and Trademark Office*